US010579795B1

(12) United States Patent
Wueest et al.

(10) Patent No.: US 10,579,795 B1
(45) Date of Patent: Mar. 3, 2020

(54) SYSTEMS AND METHODS FOR TERMINATING A COMPUTER PROCESS BLOCKING USER ACCESS TO A COMPUTING DEVICE

(71) Applicant: Symantec Corporation, Mountain View, CA (US)

(72) Inventors: Candid Wueest, Zurich (CH); Dinesh Venkatesan, Kelambakkam (IN)

(73) Assignee: CA, Inc., San Jose, CA (US)

( * ) Notice: Subject to any disclaimer, the term of this patent is extended or adjusted under 35 U.S.C. 154(b) by 135 days.

(21) Appl. No.: 15/263,981

(22) Filed: Sep. 13, 2016

(51) Int. Cl.
| | | |
|---|---|---|
| *G06F 21/55* | (2013.01) | |
| *G06F 21/52* | (2013.01) | |
| *G06F 21/56* | (2013.01) | |
| *G06F 21/57* | (2013.01) | |

(52) U.S. Cl.
CPC ............ *G06F 21/554* (2013.01); *G06F 21/52* (2013.01); *G06F 21/566* (2013.01); *G06F 21/568* (2013.01); *G06F 21/575* (2013.01); *G06F 2221/033* (2013.01)

(58) Field of Classification Search
CPC ...... G06F 21/56; G06F 21/554; G06F 21/566; G06F 21/52; G06F 21/568; G06F 21/575
See application file for complete search history.

(56) References Cited

U.S. PATENT DOCUMENTS

| | | | | |
|---|---|---|---|---|
| 6,931,540 B1 * | 8/2005 | Edwards | ............... | G06F 21/566 |
| | | | | 713/165 |
| 7,472,288 B1 * | 12/2008 | Chou | .................... | G06F 21/554 |
| | | | | 713/187 |
| 7,870,612 B2 * | 1/2011 | Liu | ........................ | G06F 21/562 |
| | | | | 713/188 |
| 9,183,392 B2 * | 11/2015 | Niemela | ............... | G06F 21/554 |
| 9,483,642 B2 * | 11/2016 | Kedma | .................... | G06F 21/56 |
| 2006/0179484 A1 * | 8/2006 | Scrimsher | ............. | G06F 21/568 |
| | | | | 726/23 |
| 2008/0064383 A1 * | 3/2008 | Nath | ...................... | H04L 41/046 |
| | | | | 455/418 |
| 2009/0038011 A1 * | 2/2009 | Nadathur | ............... | G06F 21/565 |
| | | | | 726/24 |

(Continued)

OTHER PUBLICATIONS

Daniele Sgandurra, Luis Muñoz-González, Rabih Mohsen, Emil C. Lupu,"Automated Dynamic Analysis of Ransomware:Benefits, Limitations and use for Detection", Sep. 10, 2016, Department of Computing, Imperial College London.*

(Continued)

*Primary Examiner* — Jung W Kim
*Assistant Examiner* — Sameera Wickramasuriya
(74) *Attorney, Agent, or Firm* — FisherBroyles, LLP

(57) ABSTRACT

The disclosed computer-implemented method for terminating a computer process blocking user access to a computing device may include (1) receiving, at a user computing device, a communication indicating that a user is unable to access the user computing device, (2) identifying, by the user computing device, an active computer process running on the user computing device, and (3) executing a process termination application stored on the user computing device to terminate the active computer process and enable the user to access the user computing device. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2011/0093953 | A1* | 4/2011 | Kishore | G06F 21/568 |
| | | | | 726/24 |
| 2013/0305368 | A1* | 11/2013 | Ford | G06F 21/568 |
| | | | | 726/23 |
| 2014/0181971 | A1* | 6/2014 | Tatarinov | G06F 21/566 |
| | | | | 726/23 |
| 2014/0289853 | A1* | 9/2014 | Teddy | H04L 63/1416 |
| | | | | 726/23 |
| 2014/0325654 | A1* | 10/2014 | Denis | G06F 21/567 |
| | | | | 726/24 |
| 2016/0180087 | A1* | 6/2016 | Edwards | G06F 21/566 |
| | | | | 726/24 |
| 2016/0378988 | A1* | 12/2016 | Bhashkar | G06F 21/566 |
| | | | | 726/24 |
| 2017/0171226 | A1* | 6/2017 | Watkins | H04L 63/1416 |
| 2017/0324755 | A1* | 11/2017 | Dekel | H04L 63/145 |
| 2017/0324756 | A1* | 11/2017 | Adams | H04L 63/145 |

OTHER PUBLICATIONS

Hampton, Nikolai, and Zubair A. Baig. "Ransonnware: Emergence of the cyber-extortion menace." (2015) (Year: 2015).*

Aggressive Android ransomware spreading in the USA, http://www.welivesecurity.com/2015/09/10/aggressive-android-ransomware-spreading-in-the-usa/; Sep. 10, 2015.

Mobile Security and Antivirus App, https://play.google.com/store/apps/details?id=com.eset.ems2.gp; Sep. 2, 2016.

* cited by examiner

SYSTEMS AND METHODS FOR TERMINATING A COMPUTER PROCESS BLOCKING USER ACCESS TO A COMPUTING DEVICE

BACKGROUND

Over the years, computing systems have been subjected to an increasing variety of malware attacks. One such type of malware is ransomware that prevents a user from accessing or otherwise utilizing a computing device, such as a smart phone, until the user pays a ransom to unlock the computing device. Such ransomware often executes a program that runs on the user's computing device in such manner that the user is not able to access the computing device. For example, the ransomware may activate a process that opens a foreground window that occupies the entire display region on the computing device. The ransomware may prevent the user from closing the foreground window and/or may prevent the user from disabling the process, effectively blocking the user from using the handheld device.

Once the user's computing device is locked by ransomware, the user is left with the option of either paying a ransom to a malicious party to unlock the computing device or performing a factory reset to regain control of the computing device. Unfortunately, performing a factory reset can be time consuming. Additionally, a factory reset may lead to a loss of data and the nullification of personalized user device settings. If the user opts to pay a ransom to a malicious party to unlock the computing device, there is no guarantee that all of the malicious files will all be removed from the computing device, leaving the user's computing device compromised and open to additional ransomware or other malware attacks in the future. The instant disclosure, therefore, identifies and addresses a need for systems and methods for terminating a computer process blocking user access to a computing device.

SUMMARY

As will be described in greater detail below, the instant disclosure describes various systems and methods for terminating a computer process blocking user access to a computing device. In one example, a computer-implemented method for terminating a process blocking user access to a computing device may include (1) receiving, at a user computing device, a communication indicating that a user is unable to access the user computing device, (2) identifying, by the user computing device, an active computer process running on the user computing device, and (3) executing a process termination application stored on the user computing device to terminate the active computer process and enable the user to access the user computing device. Various other methods, systems, and computer-readable media are also disclosed.

In some examples, the disclosed method may include determining that the active computer process running on the user computing device is displaying an active window on a display of the user computing device. An active screen display image of the computing device may be compared to a stored screen display image to determine if the active computer process is a suspicious computer process. The disclosed method may also include determining that the active computer process is a suspicious computer process based on at least one of a storage location of a file utilized by the active computer process, an activity level of the active computer process, and identification of non-system code in a file utilized by the active computer process.

In at least one example, the disclosed method may include determining that the communication meets a predefined criterion indicating that the user is unable to access the user computing device. The communication may be a text-based communication that includes a predefined keyword indicating that the user is unable to access the user computing device. In one example, the method may comprise storing the process termination application on the user computing device prior to receiving the communication indicating that the user is unable to access the user computing device.

In one embodiment, after the process termination application is executed to terminate the active computer process, the method may include performing a security action to protect the user computing device. Performing the security action may include monitoring for initiation of the active computer process or another active computer process on the user computing device, and executing, after the initiation of the active computer process or the other active computer process, the process termination application to terminate the active computer process or the other active computer process. In some examples, performing the security action may include at least one of quarantining files associated with the active computer process, uninstalling files associated with the active computer process, and removing files associated with the active computer process. In one example, performing the security action to protect the user computing device may include rebooting the computing device into a safe mode.

In one example, a system for terminating a computer process blocking user access to a computing device may include several modules stored in memory, including (1) a communication module, stored in memory, that receives, at a user computing device, a communication indicating that a user is unable to access the user computing device, (2) an identification module, stored in memory, that identifies an active computer process running on the user computing device, (3) a security module, stored in memory, that executes a process termination application stored on the user computing device to terminate the active computer process and enable the user to access the user computing device, and (4) at least one physical processor that executes the communication module, the identification module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a user computing device, a communication indicating that a user is unable to access the user computing device, (2) identify, by the user computing device, an active computer process running on the user computing device, and (3) execute a process termination application stored on the user computing device to terminate the active computer process and enable the user to access the user computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
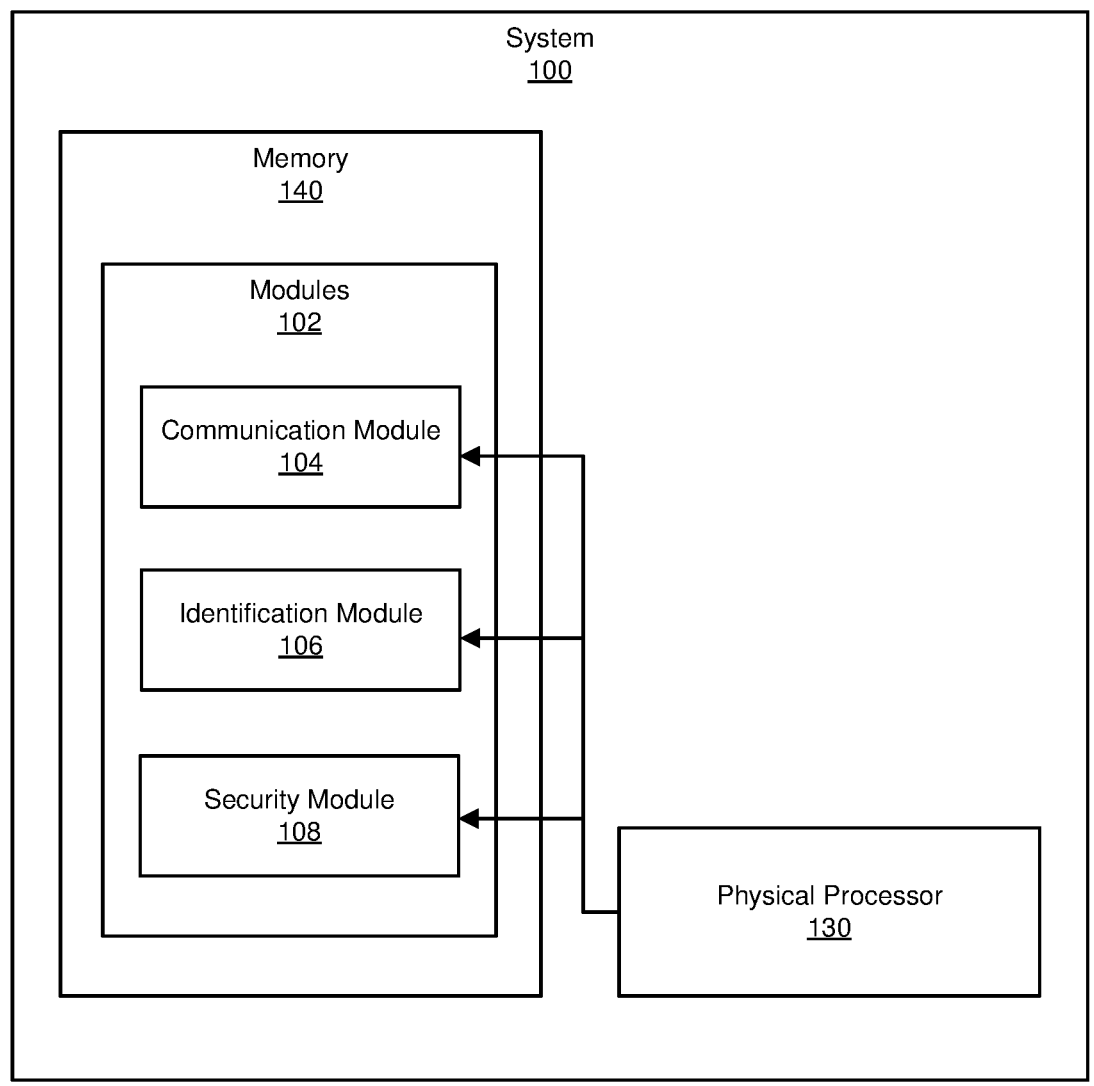
FIG. 1 is a block diagram of an example system for terminating a computer process blocking user access to a computing device.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for terminating a computer process blocking user access to a computing device. As will be explained in greater detail below, by installing a termination application on a user computing device prior to a ransomware attack on the user computing device, the systems and methods described herein may enable a user to quickly regain access to their computing device with minimal impact to the computing device. In addition, the systems and methods described herein may improve the functioning of a computing device by enabling a user to quickly regain access to the computing device and eliminate a ransomware threat without having to go through the time-consuming process of performing a factory reset of the computing device and with minimal impact to data stored on the computing device. The systems and methods described herein may also prevent malicious applications from causing harm to a user's computing device and may also prevent a user from having to pay a ransom in order to avoid losing access to important data stored on the computing device. Additionally, the systems and methods described herein may enable an active threat to a computing device to be neutralized without having to determine the exact type of threat beforehand.

Figure 2:
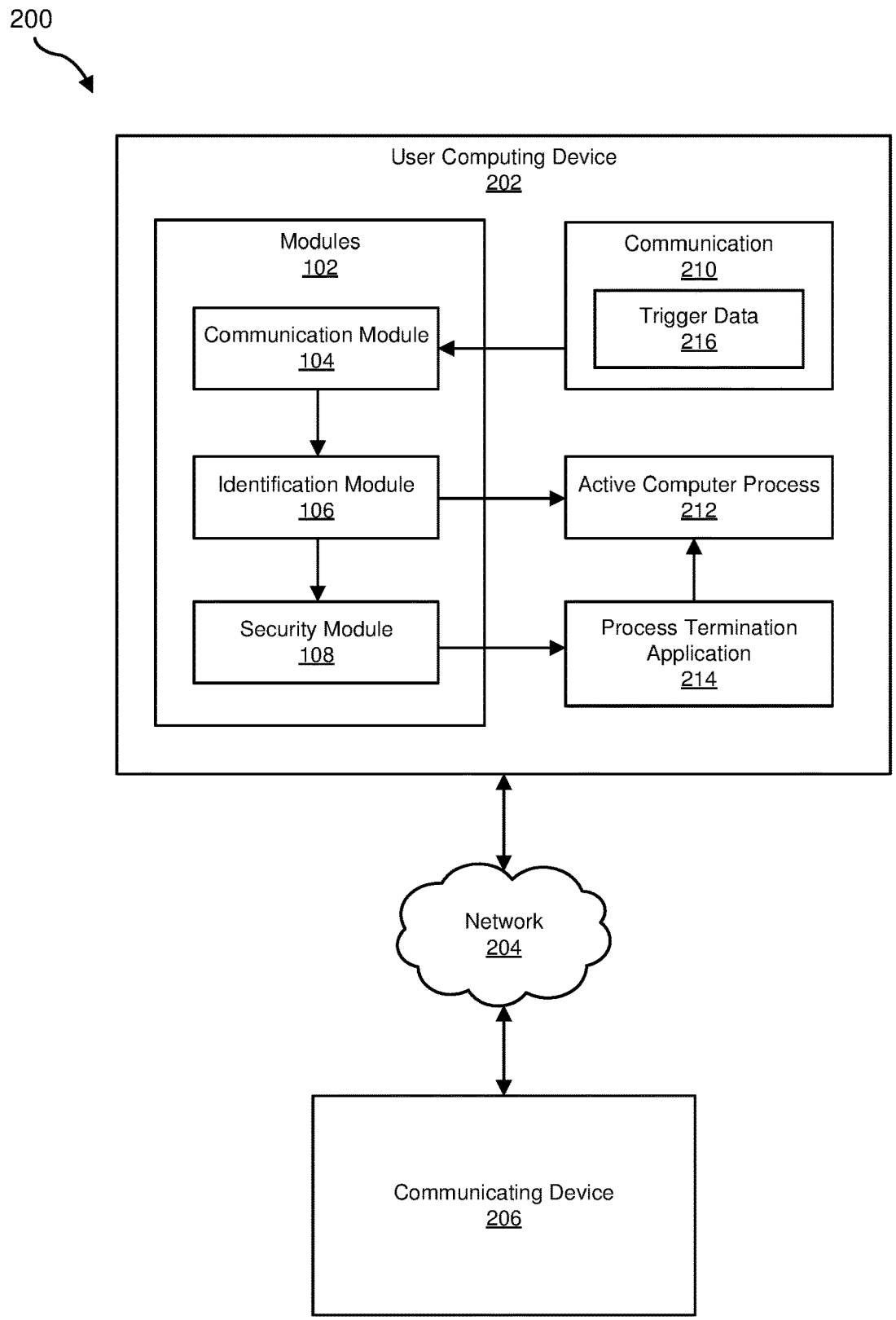
FIG. 2 is a block diagram of an additional example system for terminating a computer process blocking user access to a computing device.
Figure 3:
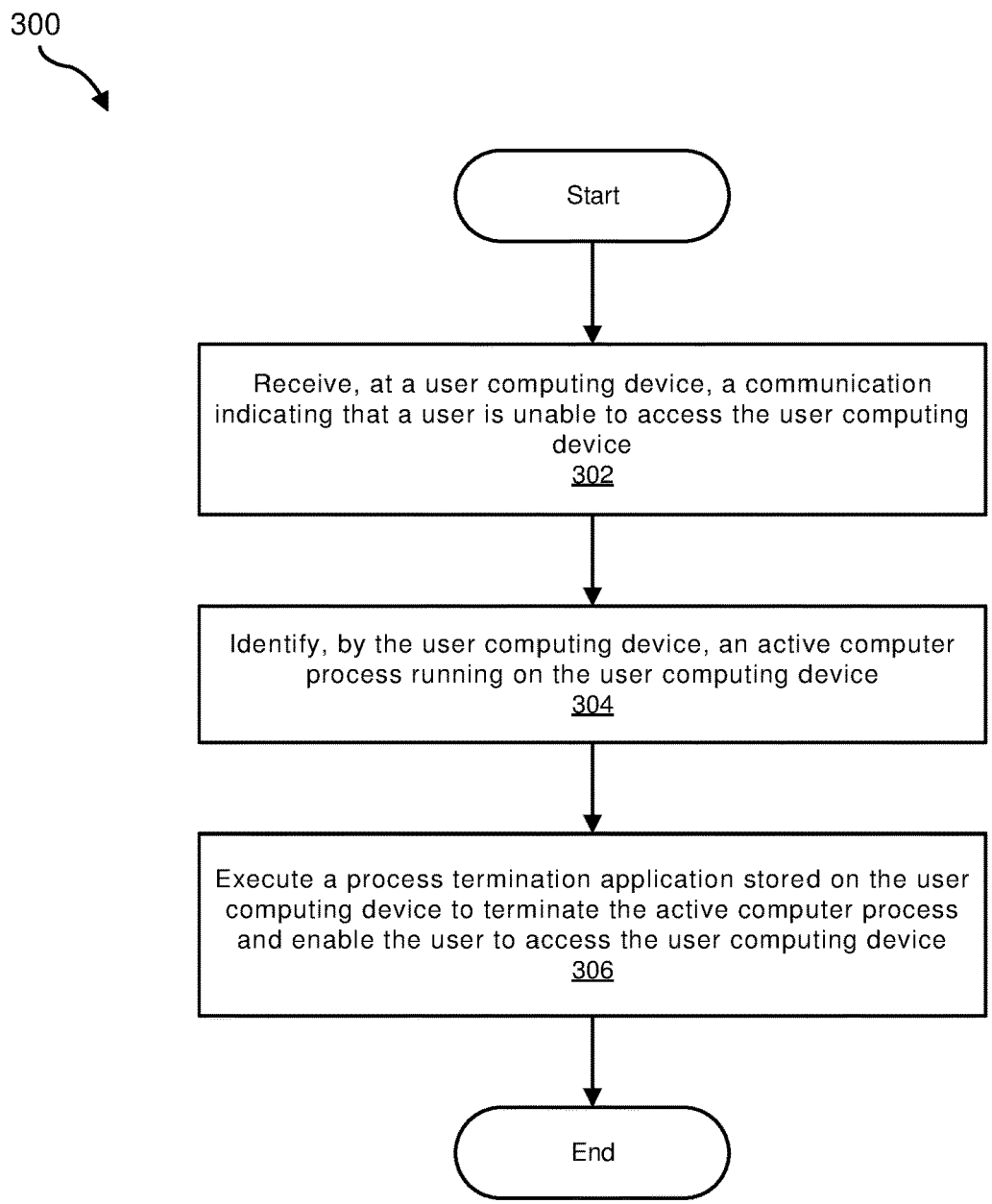
FIG. 3 is a flow diagram of an example method for terminating a computer process blocking user access to a computing device.
Figure 4:
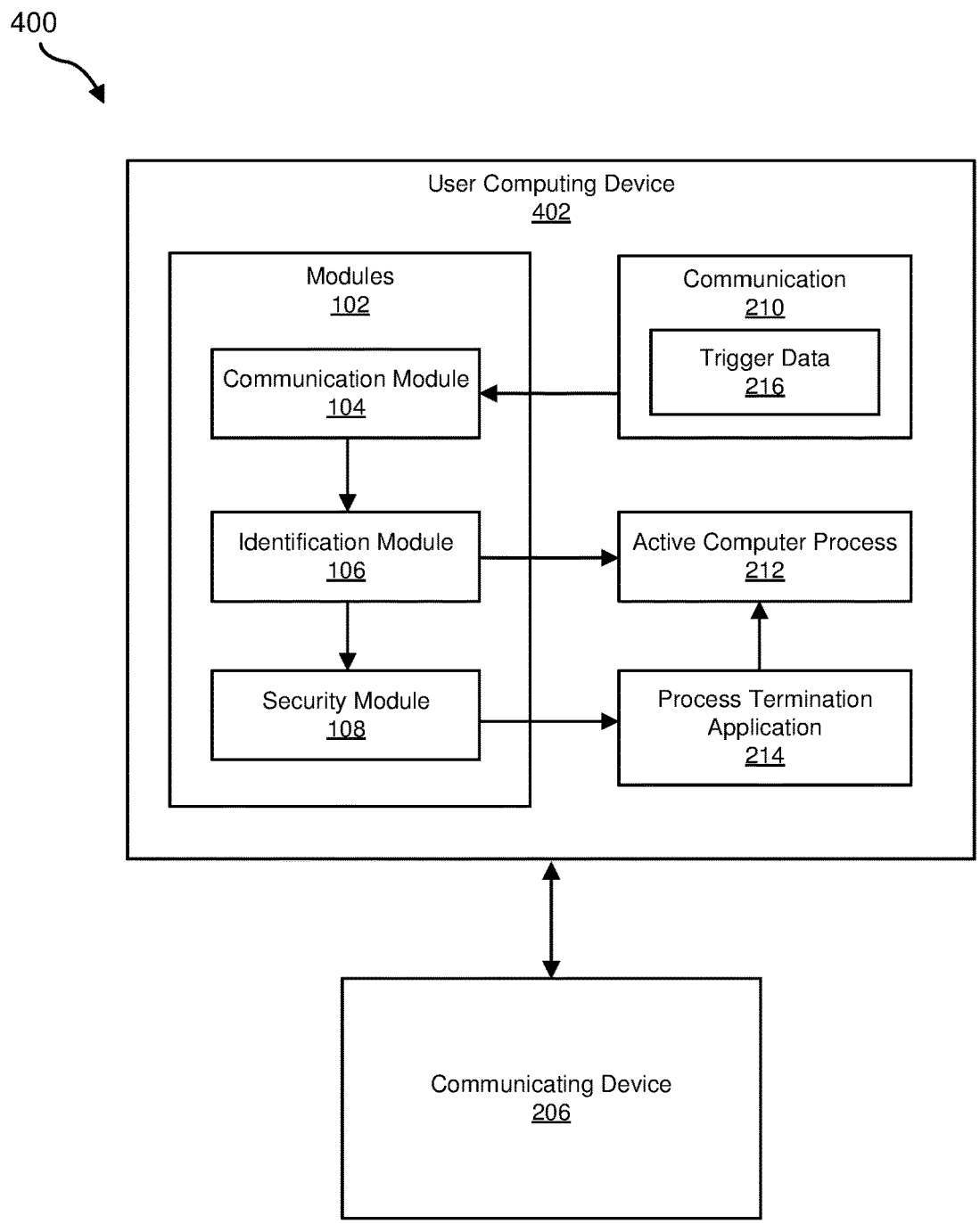
FIG. 4 is a block diagram of an additional example system for terminating a computer process blocking user access to a computing device.

The following will provide, with reference to FIGS. 1-2 and 4, detailed descriptions of example systems for terminating a computer process blocking user access to a computing device. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an example system 100 for terminating a computer process blocking user access to a computing device. As illustrated in this figure, example system 100 may include one or more modules 102 for performing one or more tasks. As will be explained in greater detail below, modules 102 may include a communication module 104 that receives, at a user computing device, a communication indicating that a user is unable to access the user computing device. Example system 100 may additionally include an identification module 106 that identifies an active computer process running on the user computing device. Example system 100 may further include a security module 108 that executes a process termination application (e.g., process termination application 120) stored on the user computing device to terminate the active computer process and enable the user to access the user computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., user computing device 202 and/or communicating device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate terminating a computer process blocking user access to a computing device. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. Additionally or alternatively, all or a portion of system 100 may represent portions of system 400 in FIG. 4. As shown in FIG. 2, system 200 may include a user computing device 202 in communication with a communicating device 206 via a network 204. In one example, all or a portion of the functionality of modules 102 may be performed by user computing device 202 and/or any other suitable computing system.

In one embodiment, one or more of modules 102 from FIG. 1 may, when executed by at least one processor of user computing device 202, enable user computing device 202 to terminate a process blocking user access to user computing device 202. For example, and as will be described in greater detail below, communication module 104 may receive a communication 210 from communicating device 206 that indicates that a user is unable to access user computing device 202. Identification module 106 may identify an active computer process 212 running on user computing device 202. Security module 108 may execute a process termination application 214, which is stored on user computing device 202, to terminate active computer process 212 and enable the user to access user computing device 202.

User computing device 202 generally represents any type or form of computing device capable of reading computer-executable instructions. In one example, computing device 202 may be a handheld or otherwise portable device (e.g., a smart phone, a mobile device, etc.). Additional examples of user computing device 202 include, without limitation, laptops, tablets, cellular phones, desktops, servers, Personal Digital Assistants (PDAs), multimedia players, embedded systems, wearable devices (e.g., smart watches, smart glasses, etc.), gaming consoles, smart televisions, smart power hubs, routers, variations or combinations of one or more of the same, computing system 510 in FIG. 5, and/or any other suitable computing device.

Communicating device 206 generally represents any type or form of computing device that is capable of communicating with user computing device 202 via network 204 and/or directly. For example, communicating device 206 may be a cellular phone that is capable of sending messages (e.g., SMS messages, email messages, chat messages, etc.) to user computing device 202. Additional examples of communicating device 206 include, without limitation, laptops, tablets, desktops, servers, Personal Digital Assistants (PDAs), multimedia players, embedded systems, wearable devices (e.g., smart watches, smart glasses, etc.), gaming consoles, variations or combinations of one or more of the same, computing system 510 in FIG. 5, and/or any other suitable computing device. Additional examples of communicating device 206 include, without limitation, security servers, application servers, web servers, storage servers, and/or database servers configured to run certain software applications and/or provide various security, web, storage, and/or database services. Although illustrated as a single entity in FIG. 2, communicating device 206 may include and/or represent a plurality of computing devices and/or servers that work and/or operate in conjunction with one another.

Network 204 generally represents any medium or architecture capable of facilitating communication or data transfer. In one example, network 204 may facilitate communication between user computing device 202 and communicating device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. In some examples, as will be discussed in greater detail below with reference to FIG. 4, communicating device 206 may communicate directly with user computing device 202 without the aid of a network.

FIG. 3 is a flow diagram of an example computer-implemented method 300 for terminating a computer process blocking user access to a computing device. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive, at user computing device 202, a communication indicating that a user is unable to access the user computing device. For example, communication module 104 may, as part of computing device 202 in FIG. 2, receive, at user computing device 202, a communication 210 indicating that a user is unable to access user computing device 202.

Communication module 104 may receive communication 210 in a variety of contexts. As described above, user computing device 202 may take various forms, such as a handheld or otherwise portable device (e.g., a smart phone, a tablet, a laptop, etc.). In some embodiments, communication module 104 may execute as part of a software security application that receives communications transmitted to user computing device 202.

Communication module 104 may comprise any suitable type of application or program having a listening function that monitors communications input to user computing device 202 for certain predefined data corresponding to at least one specified action. For example, communication module 104 may include a listening server or other program having a listening function that monitors incoming communications, including messages and/or data sent via text message (e.g., SMS, MMS, etc.), email, and/or any other suitable communication vehicle. Communication module 104 may be installed on user computing device 202 before user computing device 202 is subjected to a ransomware attack. Communication module 104 may receive communications from other devices and/or networks, even when a user is unable to access user computing device 202 due to a ransomware attack or other malware attack that allows user computing device 202 to function while blocking user access to user computing device 202 through conventional channels.

In some examples, a ransomware application that is executed on user computing device 202 may take control of user computing device 202 and prevent a user from accessing user computing device 202 and/or from accessing various programs and functionality on user computing device 202. For example, a ransomware application may open a foreground window on the display of user computing device 202. The foreground window may occupy the entire display area of the display, or a substantial portion of the display area, and prevent the user from viewing or interacting with device functionalities (e.g., icons, links, buttons, interactive display elements, etc.), effectively blocking the user from accessing user computing device 202. The foreground window generated by the ransomware application may include instructions for the user to transfer money and/or sensitive information to a malicious party in order to terminate and/or remove the ransomware application from user computing device 202. In at least one example, the ransomware application may automatically respawn in the event the user is able to close the foreground window or restart user computing device 202. In some examples, rather than generating a foreground window, a ransomware application may disable the display entirely, preventing the user from seeing and/or interacting with any content on user computing device 202.

In various embodiments, the ransomware application may prevent the user from accessing user computing device 202 without encrypting data on user computing device 202. While the ransomware application may block the user's access user to computing device 202 and/or otherwise prevent the user from executing various tasks on user computing device 202, user computing device 202 may continue to operate normally in other respects. In some examples, the ransomware application may not be detected by a security application running on user computing device 202. For example, the ransomware application may be unknown to the security application and may not carry out any actions that are determined by the security application to be suspicious. Rather, the security application may perceive the ransomware application to be a legitimate application that is not modifying data on user computing device 202 or otherwise performing functions exhibiting hallmarks of a malicious application. An open foreground window generated by the ransomware application may not in and of itself signal to the security application that user computing device 202 has been compromised by a malicious application.

According to one embodiment, communication module 104 may monitor communications received at user computing device 202 to identify a communication that meets a predefined criterion indicating that the user is unable to access user computing device 202. For example, communication module 104 may monitor communications to identify a communication that includes trigger data 216. Trigger data 216 may include any predetermined data that triggers a specified action to be carried out on user computing device 202. For example, trigger data 216 may comprise a predetermined keyword that signals to user computing device 202 that a security action is to be performed. Communication module 104 may parse text data in messages received by user computing device 202 to determine if the messages include the predetermined keyword. Trigger data 216 may also include any other predetermined data triggering a specified security action on user computing device 202, such as, for example, a predetermined data string, sound or sound sequence, image file, and/or any other suitable predetermined data.

In some examples, when a user is blocked from accessing user computing device 202, a communication 210 that includes trigger data 216, may be sent to user computing device 202 via network 204. For example, the user may utilize communicating device 206, which is separate from user computing device 202, to send communication 210 (e.g., a text message, an email message, etc.) to user computing device 202 via network 204. In some embodiments, the user may direct another party, such as a security service provider, to send communication 210 to user computing device 202.

In at least one embodiment, the user may send communication 210 to user computing device 202 directly rather than through a network. An illustration of a system 400 in which a communication is sent directly to user computing device 202 is provided in FIG. 4. As shown in FIG. 4, communicating device 206 may communicate with user computing device 202 directly rather than over a network (e.g., network 204 in FIG. 2). In this example, communicating device 206 may send communication 210 to user computing device 202 via any suitable direct connection medium, including, for example, a BLUETOOTH connection, a transmission control protocol (TCP) connection, a WiFi connection, or a wired connection (e.g., Ethernet, USB, etc.). Such a direct connection may increase the ease and speed with which the user may send communication 210 to user computing device 202.

At step 304 in FIG. 3, one or more of the systems described herein may identify, by user computing device 202, an active computer process running on user computing device 202. For example, identification module 106 may, as part of user computing device 202 in FIG. 2, identify an active computer process 212 running on user computing device 202.

Identification module 106 may identify active computer process 212 in a variety of ways. For example, identification module 106 may identify one or more processes, such as an application and/or a program, that are presently running on user computing device 202. In some examples, identification module 106 may identify multiple processes actively running on user computing device 202. Identification module 106 may determine that at least one process (i.e., active computer process 212) is a potentially malicious process and/or otherwise responsible for preventing user access to user computing device 202.

In one embodiment, identification module 106 may determine that active computer process 212 is displaying an active window on a display of user computing device 202. For example, identification module 106 may determine that active computer process 212 is displaying a foreground window on the display of user computing device 202. Identification module 106 may further determine that such a foreground window is preventing the user from accessing user computing device 202 by blocking the user from using the display screen to interact with user computing device 202. For example, user computing device 202 may be a smart phone or tablet device that receives user input via a display screen that also functions as a touch screen interface. A foreground window that occupies a substantial area of the display might prevent a user from interacting with functional screen elements that are overlapped by the foreground window.

In some examples, identification module 106 may compare an active screen display image of user computing device 202 to a stored screen display image to determine if active computer process 212 is a suspicious computer process. For example, identification module 106 may compare a screen shot of an image presently displayed on the display of user computing device 202 to a stored screen shot image of the home screen of user computing device 202 to determine if an active window is being displayed on user computing device 202.

Identification module 106 may also determine that active computer process 212 is a suspicious computer process by determining that active computer process 212 utilizes at least one file that is stored in a storage location that is suspicious. For example, active computer process 212 may utilize files that are located in a file path that has been determined to be associated with malicious programs, or in a file path that does not have any association with applications commonly utilized by user computing device 202. Additionally, identification module 106 may analyze an activity level of active computer process 212 to determine if active computer process 212 is a suspicious process. For example, identification module 106 may determine that active computer process 212 is utilizing a quantity of computing device resources exceeding a threshold value, indicating that active computer process 212 is a malicious process. Identification module 106 may also determine whether active computer process 212 utilizes one or more files that include non-system code, indicating that active computer process 212 is a suspicious process.

At step 306 in FIG. 3, one or more of the systems described herein may execute a process termination application stored on the user computing device to terminate the active computer process and enable the user to access the user computing device. For example, security module 108 may, as part of user computing device 202 in FIG. 2, execute a process termination application 214 stored on user computing device 202 to terminate active computer process 212 and enable the user to access user computing device 202.

According to some embodiments, process termination application 214 may be installed on user computing device 202 prior to user computing device 202 being subjected to a ransomware and/or other malware attack. For example, process termination application 214 may be installed on user computing device 202 to ensure that a ransomware program can be disabled without having to resort to conventional tactics for removing ransomware, such as performing a factory reset of user computing device 202 in order to regain control of user computing device 202. Process termination application 214 may be executed on user computing device 202, even when the user cannot access user computing device 202 due to a ransomware generated foreground window, disabled display, or other ransomware generated blocking feature. As such, even if ransomware that is installed and activated on user computing device 202 is not recognized as being malicious by security software running on user computing device (e.g., because the ransomware is relatively new and not known to the security software), system 200 may nonetheless enable the user to terminate the active ransomware process by sending communication 210 to user computing device 202 to trigger termination of the active ransomware process (i.e., active computer process 212) by termination application 214.

Once process termination application 214 terminates or otherwise disables active computer process 212, the user may regain partial or full access to user computing device 202 with minimal or no loss of data stored on user computing device 202. Additionally, process termination application 214 may enable the user to regain access to user computing device 202 in a shorter time frame in comparison with conventional techniques since process termination application 214 need only terminate or otherwise disable active computer process 212 as opposed to deleting a substantial portion of the data stored on user computing device 202 and resetting the device to the original factory settings. As such, executing process termination application 214 on user computing device 202 to terminate and/or otherwise disable active computer process 212 may protect user data on user computing device 202 with minimal down-time and impact to the user. Additionally, the user may avoid having to choose between either losing their data and settings stored on user computing device 202 or paying a monetary or other ransom to a malicious party in order to regain access to user computing device 202.

In some embodiments, process termination application 214 may terminate and/or otherwise disable a plurality of active processes running on user computing device 202. For example, identification module 106 may identify more than one active process running on user computing device that is suspicious. In one example, identification module 106 may identify one or more active processes, including or in addition to active computer process 212, that are not positively identified as suspicious computer processes. For example, in order to ensure that any potential threat is eliminated and the user regains access to user computing device 202, any processes running on user computing device 202 that are not essential to the basic functionality of user computing device 202 may be terminated by process termination application 214. In some examples, process termination application 214 may terminate any active processes that are tied to an open display window on user computing device 202.

After active computer process 212 is terminated or otherwise disabled by process termination application 214, security module 108 may perform additional security actions to ensure that active computer process 212 is removed from user computing device 202 and/or to eliminate futures threats from active computer process 212 and any related malicious applications or programs. In one embodiment, following termination or disabling of active computer process 212, security module 108 may reboot user computing device 202. For example, security module 108 may reboot the operating system of user computing device 202 in a diagnostic mode, such as a safe mode or safe boot, to prevent malicious processes from executing on user computing device 202 and to facilitate isolation of potential malicious threats.

In some embodiments, following termination and/or disabling of active computer process 212, security module 108 may monitor user computing device 202 for initiation of an additional computer process on user computing device 202. For example, security module 108 may monitor for respawning of active computer process 212 and/or initiation of another active computer process on user computing device for a specified time period following termination and/or disabling of active computer process 212 by process termination application 214. If security module 108 determines that active computer process 212 has respawned or another active computer process has been initiated, security module 108 may execute process termination application 214 to terminate and/or otherwise disable active computer process 212 and/or the other active computer process.

Security module 108 may further perform a disinfection routine to locate and eliminate any active and/or potential threats associated with active computer process 212. For example, security module 108 may locate and remove, quarantine, and/or uninstall files associated with active computer process 212. Additionally, user computing device 202 may locate load points and/or hooks for starting up active computer process 212 and/or any associated processes.

In some embodiments, if user computing device 202 uses a password or pin secured login for a user to access user computing device 202, security module 108 may reset the password or pin number (e.g., to a default password or pin number), or at least temporarily remove the password or pin login requirement, so as to enable the user to access user computing device 202 in the event, for example, that active computer process 212 or an associated program maliciously changed the password or pin number. According to at least one embodiment, user computing device 202 may utilize a HyperText Markup Language (HTML) login page to secure access to user computing device 202. Security module 108 may take action to verify the integrity of the HTML login page. For example, security module 108 may use a cyclic redundancy check (CRC), a hash check, and/or any other suitable verification methodology to determine whether the HTML login page has been changed or otherwise compromised. If the security module 108 determines that the HTML login page has been changed or compromised, security module 108 may replace the HTML login page from a previously created backup to ensure that the user can access user computing device 202 normally without any malicious changes being present on the access page.

As explained above in connection with example method 300 in FIG. 3, the technology may allow a user to easily terminate a locking malware process, such as ransomware, that effectively locks the user out of their own computing device (e.g., smart phone) by simply sending a communication, such as a text message communication that contains a predetermined keyword, to the computing device. Although the computing device may be essentially locked to the user, a listening function, such as a listening server, installed on the computing device may detect the keyword in the received communication. The keyword may act as a kill switch that directs the technology installed on the computing device to identify and terminate or otherwise disable the locking malware. Once the locking malware has been terminated, the technology may monitor the computing device for a specified time (e.g., approximately one or two seconds) to identify and terminate any new process spawning soon after and that may be associated with the locking malware. The technology may also disinfect the computing device to remove any artefacts, such as files, load points, and starting hooks, that may be associated with the locking malware.

Figure 5:
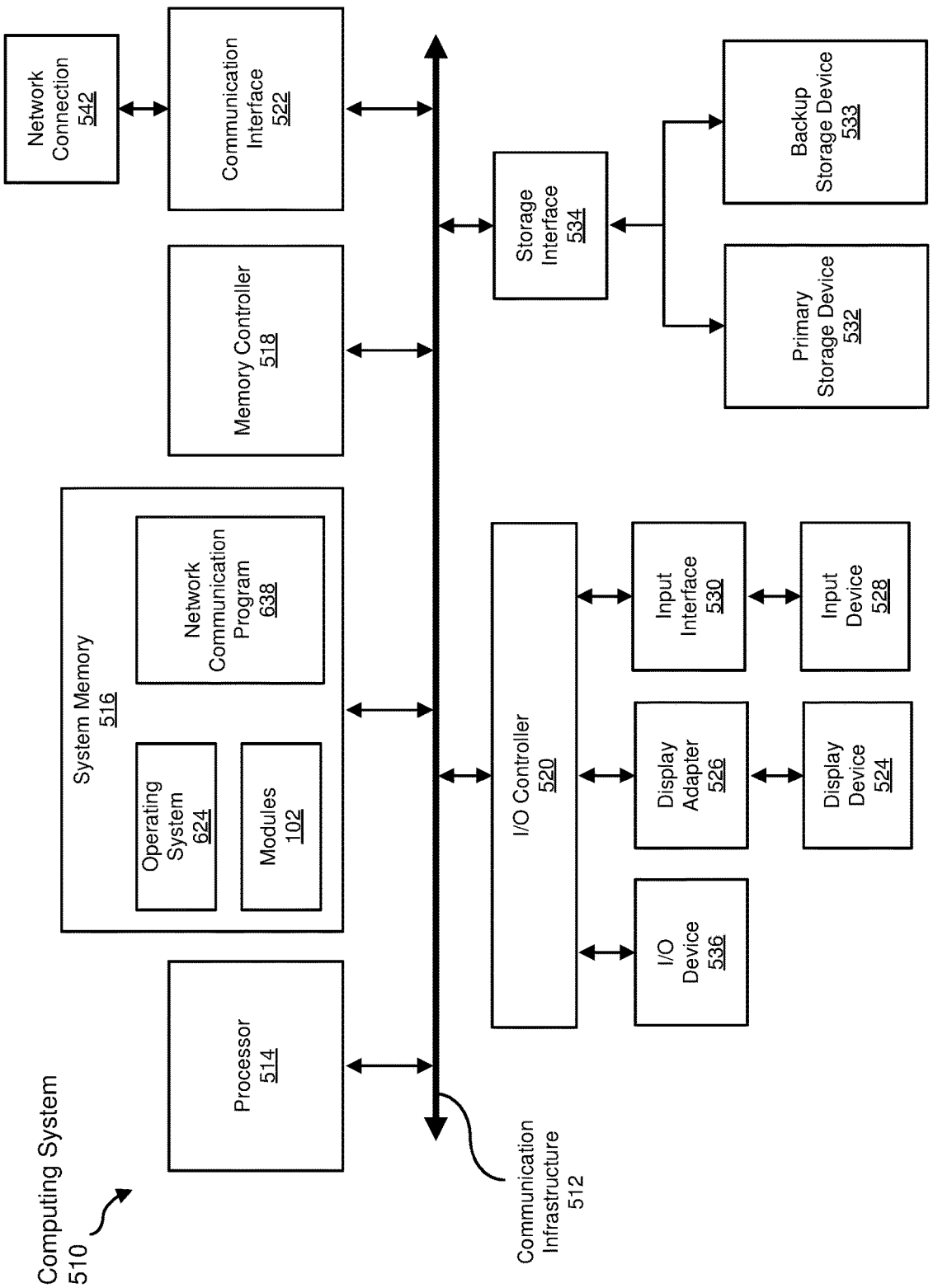
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
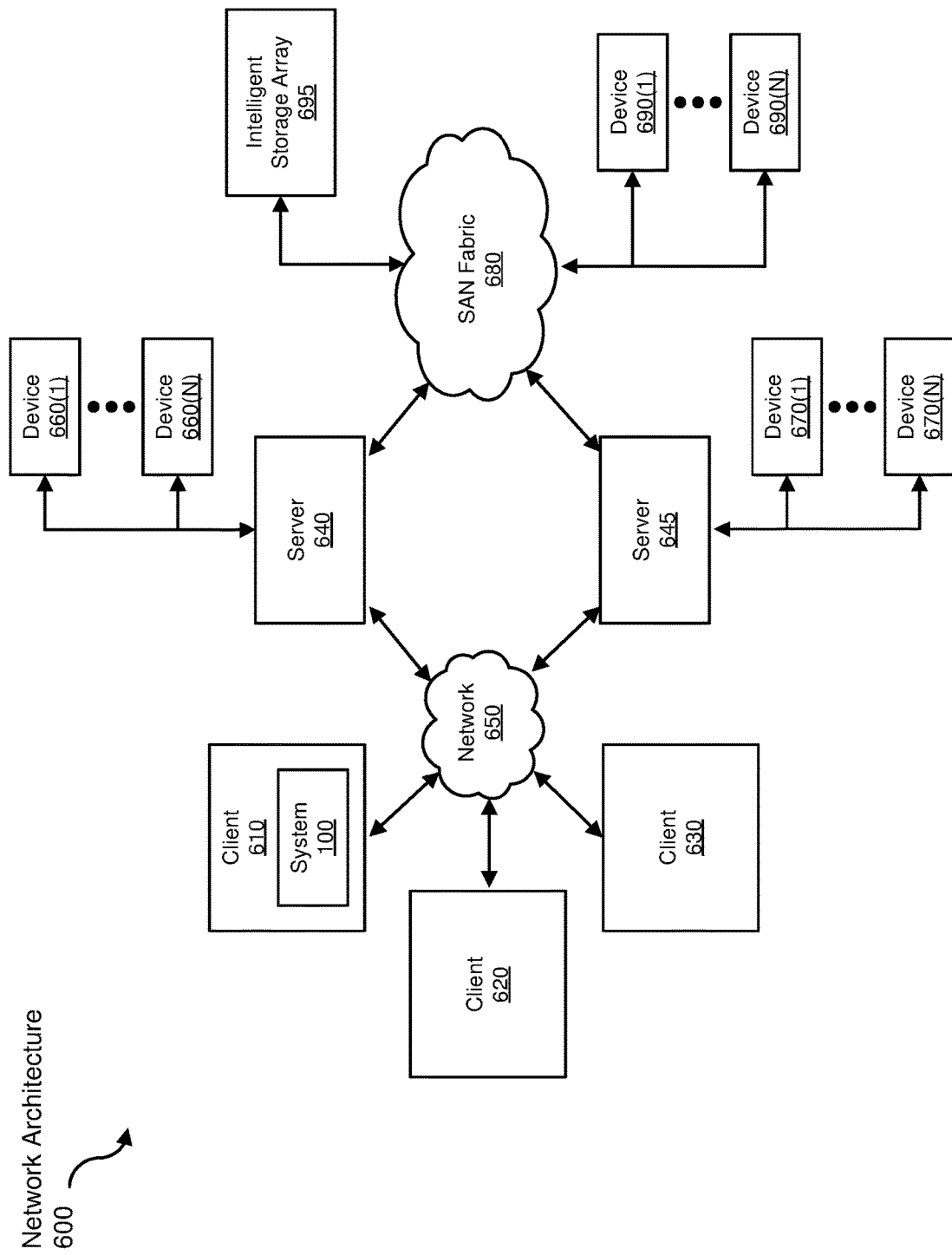
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for terminating a computer process blocking user access to a computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all ora portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for terminating a computer process blocking user access to a user computing device, the user computing device being unresponsive to user inputs, at least a portion of the method being performed by the user computing device comprising at least one processor, the method comprising:
   receiving, at the unresponsive user computing device, a communication transmitted from a second, different device that is remote from the user computing device, the communication from the second device including at least one keyword designed to trigger one or more specific security actions among a plurality of security actions on the user computing device;

determining, based on the at least one keyword, which specific security actions are to be carried out on the user computing device; and performing the determined specified security actions including:
- determining that an active process running on the computing system is displaying an active window on a display of the computing device;
- identifying, by the user computing device, one or more specific active computer processes running on the user computing device that are tied to the active window on the display;
- executing a process termination application stored on the user computing device to terminate the identified active computer processes that are tied to the active window and enable the user to access the user computing device; and
- securing access to the computing device by performing the following:
  - accessing a login page that allows limited entry to the user computing device;
  - performing a security check on the login page's underlying software code to determine whether the software code has been compromised;
  - upon determining that the login page's software code has been compromised, restoring the login page from another version previously stored as a backup; and
  - presenting the restored login page on the user computing device, allowing the user to log in to the user computing device via a known secure login page.

2. The method of claim 1, further comprising comparing an active screen display image of the user computing device to a stored screen display image to determine if the active computer process is a suspicious computer process.

3. The method of claim 1, further comprising determining that the active computer process is a suspicious computer process based on at least one of a storage location of a file utilized by the active computer process, an activity level of the active computer process, or identification of non-system code in a file utilized by the active computer process.

4. The method of claim 1, further comprising determining that the communication meets a predefined criterion indicating that the user is unable to access the user computing device.

5. The method of claim 1, wherein the communication comprises a text-based communication comprising a predefined keyword indicating that the user is unable to access the user computing device.

6. The method of claim 1, further comprising, after executing the process termination application to terminate the active computer process, performing a security action to protect the user computing device.

7. The method of claim 6, wherein performing the security action to protect the user computing device comprises:
- monitoring for initiation of the active computer process or another active computer process on the user computing device; and
- executing, after the initiation of the active computer process or the other active computer process, the process termination application to terminate the active computer process or the other active computer process.

8. The method of claim 6, wherein performing the security action to protect the user computing device comprises at least one of quarantining files associated with the active computer process, uninstalling files associated with the active computer process, and removing files associated with the active computer process.

9. The method of claim 6, wherein performing the security action to protect the user computing device comprises rebooting the user computing device into a safe mode.

10. The method of claim 1, further comprising storing the process termination application on the user computing device prior to receiving the communication indicating that the user is unable to access the user computing device.

11. A system for terminating a computer process blocking user access to a user computing device, the user computing device being unresponsive to user inputs, the system comprising:
- a communication module, stored in memory, that receives, at the unresponsive user computing device, a communication transmitted from a second, different device that is remote from the user computing device, the communication from the second device including at least one keyword designed to trigger one or more specific security actions among a plurality of security actions on the user computing device;
- a determining module, stored in memory, that determines, based on the at least one keyword, which specific security actions are to be carried out on the user computing device including determining that an active process running on the computing system is displaying an active window on a display of the unresponsive computing device;
- an identification module, stored in memory, that identifies, by the user computing device, one or more specific active computer processes running on the user computing device that are tied to the active window on the display;
- a security module, stored in memory, that executes a process termination application stored on the user computing device to terminate the active computer processes that are tied to the active window and enable the user to access the user computing device and secures access to the computing device by performing the following:
  - accessing a login page that allows limited entry to the user computing device;
  - performing a security check on the login page's underlying software code to determine whether the software code has been compromised;
  - upon determining that the login page's software code has been compromised, restoring the login page from another version previously stored as a backup; and
  - presenting the restored login page on the user computing device, allowing the user to log in to the user computing device via a known secure login page; and
- at least one physical processor that executes the communication module, the identification module, and the security module.

12. The system of claim 11, wherein the communication module determines that the communication meets a predefined criterion indicating that the user is unable to access the user computing device.

13. The system of claim 11, wherein the identification module compares an active screen display image of the user computing device to a stored screen display image to determine if the active computer process is a suspicious computer process.

14. The system of claim 11, wherein the identification module determines that the active computer process is a suspicious computer process based on at least one of a storage location of a file utilized by the active computer process, an activity level of the active computer process, or identification of non-system code in a file utilized by the active computer process.

15. The system of claim 11, wherein the communication comprises a text-based communication comprising a predefined keyword indicating that the user is unable to access the user computing device.

16. The system of claim 11, wherein the security module performs a security action to protect the user computing device.

17. The system of claim 16, wherein the security module performs the security action by at least one of quarantining files associated with the active computer process, uninstalling files associated with the active computer process, and removing files associated with the active computer process.

18. A non-transitory computer-readable medium comprising one or more computer-executable instructions that, when executed by at least one processor of a user computing device, cause the user computing device to:
  receive, at the user computing device, a communication transmitted from a second, different device that is remote from the user computing device, the user computing device being unresponsive to user inputs, the communication from the second device including at least one keyword designed to trigger one or more specific security actions among a plurality of security actions on the user computing device;
  determining, based on the at least one keyword, which specific security actions are to be carried out on the user computing device including determining that an active process running on the computing system is displaying an active window on a display of the unresponsive computing device; and
  performing the determined specified security actions including:
    identifying, by the user computing device, one or more specific active computer processes running on the user computing device that are tied to the active window on the display; and
    executing a process termination application stored on the user computing device to terminate the active computer processes that are tied to the active window and enable the user to access the user computing device and secures access to the computing device by performing the following:
      accessing a login page that allows limited entry to the user computing device;
      performing a security check on the login page's underlying software code to determine whether the software code has been compromised;
      upon determining that the login page's software code has been compromised, restoring the login page from another version previously stored as a backup; and
      presenting the restored login page on the user computing device, allowing the user to log in to the user computing device via a known secure login page.

19. The method of claim 1, wherein the second, different device transmits the communication to the user computing device without being physically connected to the user computing device.

20. The method of claim 1, wherein the second, different device comprises a mobile electronic device that transmits the communication to the user computing device via a wireless network.

* * * * *

UNITED STATES PATENT AND TRADEMARK OFFICE
CERTIFICATE OF CORRECTION

PATENT NO. : 10,579,795 B1
APPLICATION NO. : 15/263981
DATED : March 3, 2020
INVENTOR(S) : Candid Wueest et al.

Page 1 of 1

It is certified that error appears in the above-identified patent and that said Letters Patent is hereby corrected as shown below:

On the Title Page

Page 2, Column 1, item (56), Other Publications, Line 1, delete "Ransonnware" and insert
-- Ransomware --, therefor.

Signed and Sealed this
Twenty-third Day of June, 2020

Andrei Iancu
*Director of the United States Patent and Trademark Office*